US012728627B2

(12) United States Patent
Jamart et al.

(10) Patent No.: US 12,728,627 B2
(45) Date of Patent: Sep. 8, 2026

(54) COMPOSITE PANE WITH OPAQUE MASKING REGION AND PARTIALLY TRANSPARENT REFLECTIVE COATING

(71) Applicant: SAINT-GOBAIN GLASS FRANCE, Courbevoie (FR)

(72) Inventors: Juliette Pascale Jamart, Compiegne (FR); Florence Jacques, Aachen (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 387 days.

(21) Appl. No.: 18/554,591

(22) PCT Filed: Jun. 10, 2022

(86) PCT No.: PCT/EP2022/065843
§ 371 (c)(1),
(2) Date: Oct. 9, 2023

(87) PCT Pub. No.: WO2023/285044
PCT Pub. Date: Jan. 19, 2023

(65) Prior Publication Data

US 2024/0190110 A1 Jun. 13, 2024

(30) Foreign Application Priority Data

Jul. 12, 2021 (EP) .................................... 21184948

(51) Int. Cl.
*B32B 17/10* (2006.01)

(52) U.S. Cl.
CPC .. *B32B 17/10064* (2013.01); *B32B 17/10201* (2013.01); *B32B 17/10266* (2013.01);
(Continued)

(58) Field of Classification Search
CPC ........ B32B 17/10064; B32B 17/10201; B32B 17/10266; B32B 17/10513;
(Continued)

(56) References Cited

U.S. PATENT DOCUMENTS 6,495,261 B1 12/2002 Gagliardi et al.
2004/0191618 A1* 9/2004 Morin .............. B32B 17/10761 429/238

(Continued)

FOREIGN PATENT DOCUMENTS

CN 107107566 A 8/2017
CN 107111141 A 8/2017

(Continued)

OTHER PUBLICATIONS

International Search Report as issued in International Patent Application No. PCT/EP2022/065843, dated Aug. 4, 2022.

*Primary Examiner* — Betelhem Shewareged
(74) *Attorney, Agent, or Firm* — CUSHMAN PARTNERS, LLC

(57) ABSTRACT

A composite pane includes an outer pane and an inner pane, which are connected to one another via a thermoplastic intermediate layer, wherein the composite pane has an opaque masking region and a transparent see-through region, wherein the intermediate layer has a functional element which covers the entire see-through region, wherein at least one region of the side edge of the functional element does not extend as far as the side edge of the composite pane but is arranged within the masking region, and wherein the surface of the outer pane facing away from the intermediate layer has a pattern of coated regions in the masking region which are provided with a partially transparent reflective coating.

20 Claims, 5 Drawing Sheets

Figure 1:
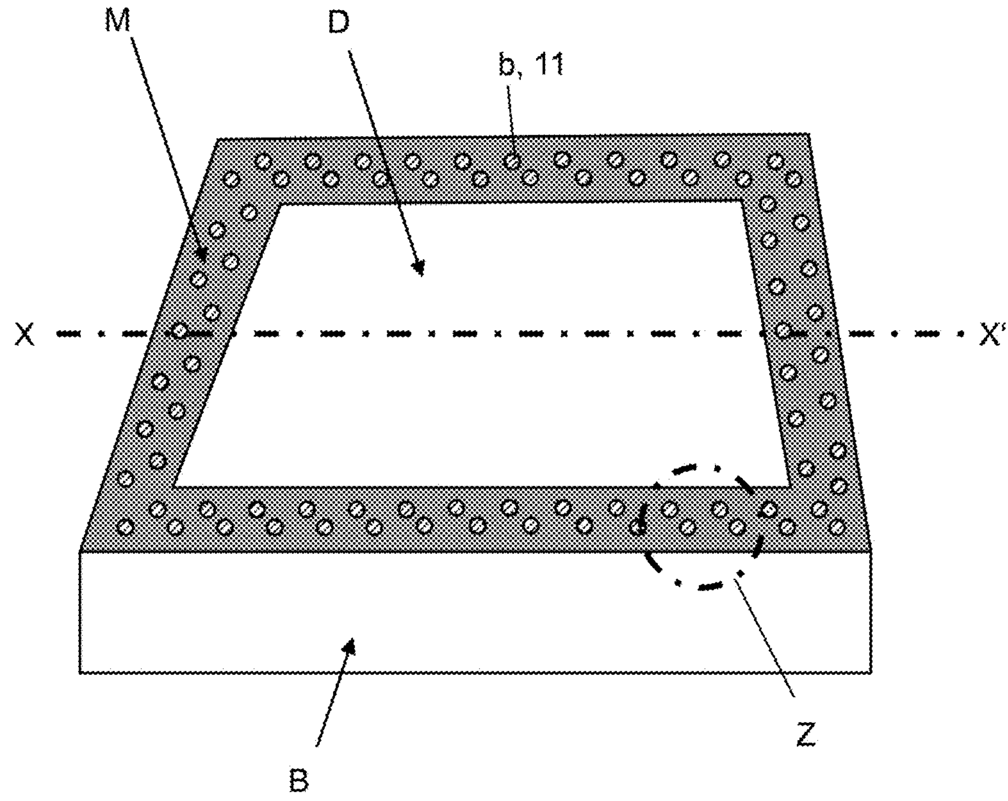

(52) U.S. Cl.
CPC .. *B32B 17/10513* (2013.01); *B32B 2307/402* (2013.01); *B32B 2307/41* (2013.01); *B32B 2307/412* (2013.01); *B32B 2307/416* (2013.01); *B32B 2307/7376* (2023.05)

(58) Field of Classification Search
CPC .......... B32B 2307/402; B32B 2307/41; B32B 2307/412; B32B 2307/416; B32B 2307/7376
USPC ........................................................ 428/195.1
See application file for complete search history.

(56) References Cited

U.S. PATENT DOCUMENTS

2004/0227462 A1 11/2004 Utsumi et al.
2012/0026573 A1 2/2012 Collins et al.
2013/0266781 A1* 10/2013 Hoffmann ............... F24C 15/10 427/269
2015/0244089 A1* 8/2015 Reul ................. B32B 17/10495 156/182
2020/0061974 A1* 2/2020 Dröge ............... B32B 17/10302
2024/0190110 A1* 6/2024 Jamart .............. B32B 17/10183

FOREIGN PATENT DOCUMENTS

CN 109874319 A 6/2019
DE 10 2008 026339 A1 12/2009
EP 0 876 608 B1 4/2002
EP 1 862 849 A1 12/2007
WO WO 2005/063645 A1 7/2005
WO WO 2010/112789 A2 10/2010
WO WO 2010/147494 A1 12/2010
WO WO 2011/033313 A1 3/2011
WO WO 2012/007334 A1 1/2012
WO WO 2014/174308 A1 10/2014
WO WO 2017/157626 A1 9/2017
WO WO 2020/094324 A1 5/2020
WO WO 2022/073894 A1 4/2022
WO WO 2022/117955 A1 6/2022

* cited by examiner

COMPOSITE PANE WITH OPAQUE MASKING REGION AND PARTIALLY TRANSPARENT REFLECTIVE COATING

CROSS-REFERENCE TO RELATED APPLICATIONS

This application is the U.S. National Stage of PCT/EP2022/065843, filed Jun. 10, 2022, which in turn claims priority to European patent application number 21184948.4 filed Jul. 12, 2021. The content of these applications are incorporated herein by reference in their entireties.

The invention relates to a composite pane comprising a transparent see-through region and an opaque masking region and to the use thereof.

In the automotive and architectural fields, composite panes are customary as glazing. They consist of an outer pane and an inner pane which are connected to one another via a thermoplastic intermediate layer. Frequently, different types of functional elements are embedded in the intermediate layer, which provide the composite pane with a desired function. An example of such functional elements are IR-reflecting and/or heatable coatings. Another example is functional elements comprising electrically controllable optical properties, for example SPD (suspended particle device) functional elements, PDLC (polymer-dispersed liquid crystal) functional elements or electrochromic functional elements. The optical properties of such functional elements and of the composite panes equipped therewith, in particular their light transmission or light scattering properties, can be controlled by an applied voltage.

The side edges of the functional elements typically do not extend as far as the side edges of the composite pane so that the functional elements are embedded securely in the composite pane and protected against corrosion and damage. Were the side edge of the functional element located in the see-through region of the composite pane, it would distract the viewer and reduce the aesthetic value of the composite pane. This particularly applies to functional elements which have to be electrically contacted, for example heatable layers or functional elements with electrically controllable optical properties. The electrical contact is generally made by means of busbars and electrical cables which should not be visible to the viewer either. It is therefore customary to provide the composite pane with an opaque masking region, typically circumferentially in a peripheral edge region, with which the side edge of the functional element as well as any electrical contact, is hidden, so to speak. The masking region is typically formed by an opaque, usually black cover print on the outer pane and the inner pane. Reference is made by way of example to WO2017157626A1.

WO2020094324A1 and WO2014174308A1 also disclose composite panes comprising embedded functional elements and opaque masking regions.

In the vehicle sector, such opaque masking regions for windshields, rear windows and roof panels have long been common for protecting the adhesive used for installation against UV radiation. In contrast, in the case of other panes, for example in vehicle side windows or building glazing, masking regions are not usual and therefore appear unusual and visually unattractive to the viewer. There is therefore a need for composite panes having opaque masking regions, which are aesthetically pleasing and are not perceived by the viewer to be distracting.

The post-published international patent applications WO2022117955A1 and WO2022073894A1 disclose partially transparent reflective coatings that are printed on and contain metal oxides.

The object of the present invention is to provide an improved composite pane having a functional element, a transparent see-through region and an opaque masking region, in which the masking region is designed to be aesthetically pleasing.

The object is achieved by a composite pane according to independent claim 1. Preferred embodiments can be found in the dependent claims.

The composite pane according to the invention comprises at least one outer pane and one inner pane which are connected to one another via a thermoplastic intermediate layer. The composite pane is provided for separating the interior space from the external environment during a window opening (in particular a window opening of a vehicle, but alternatively also a window opening of a building or a room). In the context of the invention, the term "inner pane" is understood to mean the pane facing the interior space. Outer pane means the pane facing the external environment. The outer pane and the inner pane each have an outer and an interior-side surface and a circumferential side edge surface extending between them. In the context of the invention, the outer surface means the main surface which is provided to face the external environment when installed. In the context of the invention, the interior-side surface means the main surface which is intended to face the interior space when installed. The interior-side surface of the outer pane and the outer surface of the inner pane face one another and are connected to one another by the thermoplastic intermediate layer.

The outer pane and the inner pane are preferably glass panes, particularly preferably made of soda-lime glass, as is customary for window panes. However, one or both of the panes can also be made from other types of glass, for example quartz glass, borosilicate glass or aluminosilicate glass, or from rigid clear plastics, for example polycarbonate or polymethyl methacrylate. The panes can be clear or tinted or coloured. The thicknesses of the outer pane and the inner pane are, independently of one another, preferably from 0.5 mm to 5 mm, particularly preferably from 1 mm to 3 mm.

The intermediate layer is preferably made of at least one thermoplastic film (connecting film). The at least one film (connecting film) is preferably based on polyvinyl butyral (PVB), ethylene vinyl acetate (EVA) or polyurethane (PU), particularly preferably based on PVB. This means that the film predominantly contains said material (more than 50% by weight) and can, in addition, optionally contain further components, for example plasticizers, stabilizers, UV- or IR-absorbers. The thickness of each thermoplastic film is preferably from 0.2 mm to 2 mm, particularly preferably from 0.3 mm to 1 mm. For example, films, in particular PVB films, with standard thicknesses of 0.38 mm or 0.76 mm can be used.

The composite pane according to the invention has an opaque masking region and a transparent see-through region. Within the context of the invention, a masking region refers to a region of the composite pane through which it is not possible to see. The degree of light transmission of the masking region is preferably substantially 0%. Within the context of the invention, a see-through region refers to a region of the glass pane which makes it possible to see through the glass pane and therefore has a certain degree of transparency or at least translucency. The degree of light transmission of the see-through region is preferably at least 10%, particularly preferably at least 20%. Should the functional element according to the invention have electrically controllable optical properties, these specifications will refer to the transparent state of the functional element (maximum light transmission and/or minimal light scattering).

In a typical embodiment, the masking region surrounds the see-through region in a frame-like manner. The masking region is therefore arranged circumferentially around the see-through region. Typically, the masking region forms the edge region of the composite pane, at least in regions in this case. This means that the masking region is adjacent at least to a portion of the side edge of the composite pane.

The masking region is formed by an opaque element which is arranged on the outside of the functional element. This means that said opaque element is at a shorter distance than the functional element from the external environment. A view of the side edge of the functional element from the outside is thereby prevented.

In a preferred embodiment, the masking region is formed by a cover print on the interior-side surface of the outer pane facing the intermediate layer. In other words, the interior-side surface of the inner pane is provided with the cover print, preventing the ability to look through the composite pane and forming the masking region. Such cover prints are common in particular in the vehicle sector, in particular for windshields, rear windows and roof panels. The cover print typically contains a pigment and glass frits. The glass frits can be melted and the cover print can thereby be permanently bonded (fused) to the glass surface. The pigment provides the opacity of the masking region. The cover print is preferably printed onto the outer pane, in particular by screen printing. The pigment is typically a black pigment, such as pigment carbon black, aniline black, bone black, iron oxide black, spinel black and/or graphite. The cover print preferably has a thickness of 5 μm to 50 μm, particularly preferably of 8 μm to 25 μm. The inner pane, in particular the interior-side surface thereof, can optionally also be provided with a cover print.

Alternatively, however, it is also possible to form the masking region by a tinted or coloured film in the intermediate layer. For example, at least one thermoplastic connecting film between the functional element and the outer pane can thus be tinted in the masking region or a connecting layer can be composed of a plurality of portions of different films, wherein a tinted film is used in the masking region and a clear film is used in the see-through region. Alternatively, an opaque film can also be inserted into the intermediate layer between the functional element and the outer pane.

Optionally, a further opaque element can also be arranged in the masking region on the interior side with respect to the functional element. As a result, a view of the side edge of the functional element from the inside is also prevented. For example, the inner pane, in particular the interior-side surface thereof, can also be provided with a cover print or an opaque film can be provided between the functional element and the inner pane.

In addition to the connecting films, the intermediate layer has a functional element. In other words, if the intermediate layer contains a functional element, the intermediate layer will be equipped with a functional element or a functional element will be embedded in the intermediate layer. The functional element is therefore arranged between the outer pane and the inner pane and can optionally be in direct contact with the surface of the outer pane and/or of the inner pane facing the intermediate layer. The functional element is in particular arranged flat between the outer pane and the inner pane, substantially in parallel with said panes.

In the context of the invention, a functional element is understood to mean a flat, in particular layer-like or film-like element or component which provides the see-through region of the composite pane with an additional function or property. This can relate, for example, to the colour, the effect on electromagnetic radiation, a heating function or the possibility of electrically controlling the optical properties (in particular the degree of light transmission or light scattering).

The functional element covers the entire see-through region of the composite pane. This means that the functional element is arranged between the outer pane and the inner pane in such a way that the entire see-through region is provided with the functional element. Light that passes through the see-through region of the composite pane therefore inevitably also always passes through the functional element.

According to the invention, at least one region of the side edge of the functional element does not extend as far as the side edge of the composite pane. At least one region of the side edge of the functional element is therefore not flush with the side edge of the composite pane, which in turn is formed by the (substantially flush) side edge of the inner pane, the outer pane and the intermediate layer. Instead, said region of the side edge of the functional element is set back relative to the side edge of the composite pane and is arranged in the masking region. The functional element thus has a surface area which is larger than that of the see-through region but smaller than that of the entire composite pane.

Typically, the entire circumferential side edge of the functional element does not extend as far as the side edge of the composite pane, but is arranged in the masking region. There is therefore no region of the side edge of the functional element which is flush with the side edge of the composite panes. The circumferential side edge of the functional element is thus set back with respect to the side edge of the composite pane so to speak. In an advantageous embodiment, the distance between the side edge of the functional element and the side edge of the composite pane is at least 15 mm in order to ensure a stable connection between the outer pane and the inner pane in the edge region and to prevent moisture entering the functional element.

Since the side edge of the functional element does not extend as far as the side edge of the composite pane, direct contact between the functional element and the surrounding atmosphere can be prevented. The functional element is instead fully embedded in the composite pane. This is particularly advantageous when the functional element contains metal components which can corrode upon contact with the atmosphere. In a particularly advantageous embodiment, the functional element therefore contains metal, in particular at least one thin metal-based layer.

Since the side edge of the functional element is arranged in the masking region, it is not visible to the viewer. A visible side edge would be distracting and reduce the aesthetic value of the composite pane.

According to the invention, the outer surface, facing away from the intermediate layer, of the outer pane has a pattern of coated regions in the masking region, which coated regions are provided with a partially transparent reflective coating. Said pattern is present at least in a portion of the masking region and can optionally extend beyond the masking region to the see-through region. Due to the pattern of regions coated according to the invention, the masking region is designed to be more aesthetically pleasing for an outside viewer. This is the major advantage of the invention. The masking region is then less distracting. This is particularly advantageous in particular for panes in which there is usually no masking strip, which would thus be especially distracting to the viewer (for example, composite panes in the architectural field or vehicle side windows, in particular side windows that can be raised and lowered). The interior-side surface, facing away from the intermediate layer, of the inner pane can optionally likewise be provided with a pattern of coated regions having the partially transparent reflective coating, as a result of which the masking region is also designed to be more aesthetically pleasing for an interior-side viewer.

Within the context of the invention, a partially transparent reflective coating is understood to mean a coating which transmits a significant proportion of the electromagnetic radiation in the visible spectral range of from 380 nm to 780 nm impinging thereon and reflects a likewise significant proportion of said radiation. A significant proportion here in particular means a proportion greater than 10%. In an advantageous embodiment, the integrated light transmission and the integrated light reflection are each at least 10%, preferably at least 15%, particularly preferably at least 20%, as measured with a light source D65, when the coating is applied to a clear soda-lime glass pane having a thickness of 3.85 mm. The light reflection is measured at an angle of incidence and observation of 10°, wherein, in addition to directional reflection, diffuse reflection is also taken into account. Particularly preferably, the integrated light transmission under said conditions is from 60% to 90%, in particular from 70% to 80%, and the integrated light reflection is from 10% to 40%, in particular from 20% to 30%.

The pattern of coated regions means that, in addition to the coated regions, uncoated regions are also present in the masking region which are not provided with the partially transparent reflective coating. The masking region is therefore not completely provided with the partially transparent reflective coating. The pattern is preferably designed in such a way that the coated regions are not connected to one another. Instead, the coated regions are isolated from one another in such a way that each coated region is separated from the others by an altogether contiguous uncoated region. The coated regions are designed in the manner of islands so to speak. The pattern of coated regions is preferably designed in such a way that the surface coverage of the coated regions (i.e. the proportion of coated regions in the total area of the pattern) is from 5% to 90%, particularly preferably from 10% to 50%, very particularly preferably from 20% to 40%.

The coated regions can be designed, for example, in the form of geometric figures or in the form of symbols or logos, for example the company logo of the glass manufacturer or vehicle manufacturer (in the case of a vehicle pane).

Each coated region preferably extends by at least 0.2 mm, particularly preferably at least 0.4 mm, very particularly preferably from 0.4 mm to 15 mm. The distance between adjacent coated regions is preferably at least 0.5 mm and the distance between the coated regions and the side edge of the composite pane is preferably at least 1.5 mm.

The functional element can be designed in different ways. In one embodiment, the functional element reflects electromagnetic radiation which passes through the see-through region, in particular infrared (IR) or ultraviolet radiation components. As a result, thermal comfort in the interior can be improved by preventing excessive heating due to solar irradiation. The functional element can, for example, be a coating which is applied on the interior-side surface of the outer pane or to the outer surface of the inner pane. Particularly preferably, the coating is an IR-reflecting coating which consists of a stack of thin layers which contains at least one metal-based layer, in particular based on silver. The functional element can also be a coated polymer film, wherein a carrier film having such an IR-reflecting coating is provided. The carrier film is usually based on polyethylene terephthalate (PET) and has a thickness of 20 μm to 200 μm. The coated polymer film is preferably arranged between two connecting films of the intermediate layer.

In a further embodiment, the functional element has a heating function such that the composite pane can be electrically heated. In this case, a thin-film coating of the type described above as an IR-reflecting coating is preferably used, either deposited on the outer pane or the inner pane or on a carrier film. The electrically conductive coating is electrically contacted and connected to an external voltage source so that it can be heated by an electrical current flow. The two poles of the voltage source are typically connected to opposite side edges of the coating.

The functional element can also be a coloured coating or a coloured, coated or printed-on film in order to change the colour of the see-through region.

In a further embodiment, the functional element is has electrically controllable optical properties. Such a functional element contains an active layer or layer sequence which is arranged between a first and a second planar electrode. The active layer or layer sequence has the variable optical properties which can be controlled by a voltage applied to the planar electrodes. The variable optical properties relate in particular to the degree of light transmission and/or the degree of light scattering, wherein, within the context of the invention, light is understood in particular to mean visible light in the spectral range of from 380 nm to 780 nm. In the context of the invention, electrically controllable optical properties are understood, in particular, to mean such properties which are continuously controllable. In principle, however, it is also conceivable that the electrically controllable optical properties can only be switched between two discrete states. It is also conceivable that the electrically controllable optical properties can be switched between more than two discrete states.

The electrically controllable functional element can be a PDLC (polymer-dispersed liquid crystal) functional element. PDLC functional elements contain an active layer between the planar electrodes. The active layer is a PDLC layer and contains liquid crystals which are embedded in a polymer matrix. PDLC functional elements are typically operated using AC voltage. If no voltage is applied to the planar electrodes, the liquid crystals will be aligned in a unordered manner, which results in strong scattering of the light passing through the active layer. If a voltage is applied to the planar electrodes, the liquid crystals will align in a common direction and the transmission of light through the active layer is increased. Such a functional element is known, for example, from DE 102008026339 A1. The term PDLC is to be interpreted broadly within the context of the invention and includes related functional elements which are based on the alignment of liquid crystals, for example PNLC (polymer-networked liquid crystal) functional elements.

The electrically controllable functional element can alternatively be an SPD (suspended particle device) functional element. SPD functional elements contain an active layer between the planar electrodes. The active layer contains suspended particles that are preferably embedded in a viscous matrix. SPD functional elements are operated using AC voltage. The absorption of light by the active layer can be varied by applying a voltage on the surface electrodes, which results in a change in orientation of the suspended particles. Such functional elements are known, for example, from EP 0876608 B1 and WO 2011033313 A1.

The electrically controllable functional element can alternatively be an electroluminescent functional element. The active layer contains electroluminescent materials that can be inorganic or organic (OLED). Applying a voltage on the surface electrodes excites the luminescence of the active layer. Such functional elements are known, for example, from US 2004227462 A1 and WO 2010112789 A2.

In a particularly preferred embodiment, the electrically controllable functional element is an electrochromic functional element. Electrochromic functional elements contain an active layer sequence between the planar electrodes (electrochromic layer sequence). The active layer sequence comprises the following arranged in a flat manner one above the other in the order indicated:

an ion storage layer, an electrolyte layer, and an electrochromic layer.

The electrochromic layer is the actual bearer of the electrically controllable optical properties. It is an electrochemically active layer whose degree of light transmission is dependent on the degree of ion storage. The ions (for example $H^+$—, $Li^+$, $Na^+$— or $K^+$ ions) are stored in and provided by the ion storage layer. The electrolyte layer separates the electrochromic layer spatially from the electrochromic layer and serves to migrate ions. If a DC voltage of suitable polarity is applied to the planar electrodes, ions will migrate from the ion storage layer, through the electrolyte layer and into the electrochromic layer, whereupon the optical properties (colour, light transmission) of the electrochromic layer are changed depending on the quantity of ions that have migrated into said layer. If DC voltage of the opposite polarity is applied to the planar electrodes, the ions will migrate from the electrochromic layer, through the electrolyte layer and back into the ion storage layer and the optical properties of the electrochromic layer change in the opposite manner. If no voltage is applied to the planar electrodes, the current state will remain stable. Suitable electrochromic layers contain electrochromic materials, for example inorganic oxides (such as tungsten oxide or vanadium oxide), complex compounds (such as Prussian blue) or conductive polymers (such as 3,4-polyethylenedioxythiophene (PEDOT) or polyaniline). Electrochromic functional elements are known, for example, from WO 2012007334 A1, US 20120026573 A1, WO 2010147494 A1 and EP 1862849 A1. The electrolyte layer is typically designed as a film of organic or inorganic, electrically insulating material with a high degree of ion conductivity, for example based on lithium phosphorus oxynitride. The ion storage layer is either permanently transparent (pure ion storage) or has electrochromic behaviour opposite that of the electrochromic layer. One example of pure ion storage is layers containing a mixed oxide of titanium and cerium; examples of anodically electrochromic ion storage layers are layers containing iridium oxide or nickel oxide.

Electrochromic functional elements are therefore particularly preferred because they have slow switching behaviour compared with other controllable functional elements. As a result, in the event of a switching process, the user does not perceive a simultaneous and homogeneous change in the optical properties; the see-through region is thus not darkened simultaneously and homogeneously, for example. Instead, the change in the optical properties starts from the place where the planar electrodes are connected to the voltage source and noticeably spreads into the remaining regions of the functional element. This inhomogeneous, regionally delayed change in the optical properties can seem unusual to the user and be distracting. The pattern according to the invention on printed-on regions having the partially transparent reflective coating can be used in this case to visually accompany, as it were, the process by which the change in the optical properties spreads. The pattern can indicate a direction which coincides with the direction in which the change in the optical properties spreads so that the inhomogeneous, delayed switching behaviour is perceived as less disturbing, if not even desired. Suitable and preferred embodiments of the pattern will be discussed at a later point.

The planar electrodes of the functional elements having electrically controllable optical properties are preferably transparent, which means, within the context of the invention, that they have a degree of light transmission in the visible spectral range of at least 50%, preferably at least 70%, particularly preferably at least 80%. The planar electrodes are in particular electrically conductive thin layers or thin-layer stacks. The planar electrodes preferably contain at least one metal, a metal alloy or a transparent conducting oxide (TCO). The planar electrodes particularly preferably contain at least one transparent conductive oxide. The planar electrodes can, for example, be based on silver, gold, copper, nickel, chromium, tungsten, indium tin oxide (ITO), gallium-doped or aluminium-doped zinc oxide and/or fluorine-doped or antimony-doped tin oxide, preferably based on silver or ITO. The planar electrodes preferably have a thickness of 10 nm to 2 μm, particularly preferably of 20 nm to 1 μm, very particularly preferably of 30 nm to 500 nm, and in particular of 50 nm to 200 nm. If a thin layer is based on a material, this means within the context of the invention that the layer consists largely of the material (more than 50 wt. %, preferably more than 90 wt. %, in particular more than 99 wt. %), wherein the layer can contain small amounts of other materials, for example dopings.

The functional element having electrically controllable optical properties can be formed directly on the interior-side surface of the outer pane or on the outer surface of the inner pane. In a preferred embodiment the functional element is, however, designed as a multilayer film. The multilayer film is a layer stack, wherein the layers of the layer stack comprise at least one first carrier film, the first planar electrode, the active layer or the active layer sequence, the second planar electrode and a second carrier film, which are arranged in this order in a flat manner one above the other. The layers of the layer stack are permanently connected to one another in a stable manner, for example by gluing or lamination. Multilayer films of this type are typically commercially available and can be purchased, for example, through a glass manufacturer, cut to the required size and incorporated in the composite pane.

The carrier films preferably contain at least one thermoplastic polymer or are based thereon, particularly preferably polyethylene terephthalate (PET), polypropylene, polyvinyl chloride, fluorinated ethylene propylene, polyvinyl fluoride or ethylene tetrafluoroethylene, very particularly preferably PET. This is particularly advantageous with regard to the stability of the multilayer film. The thickness of each carrier film is preferably from 0.05 mm to 1 mm, particularly preferably from 0.1 mm to 0.5 mm, in particular from 0.1 mm to 0.2 mm. On the one hand, a low thickness of the glazing in which the multilayer film is to be used is advantageously achieved by carrier films having such a low thickness. On the other hand, effective protection of the active layer and of the electrically conductive layers is ensured. In the method according to the invention, the carrier films are preferably not damaged, i.e. the isolation line does not extend to the carrier films.

The side edge of the multilayer film can be sealed, for example by fusing the carrier films or by a (preferably polymeric) tape. The active layer can thus be protected, in particular from components (in particular plasticizers) of the intermediate layer of a composite pane in which the multilayer film is embedded diffusing into the active layer, which can lead to degradation of the functional element.

The multilayer film is preferably embedded in the intermediate layer of the composite pane. For this purpose, each carrier film is preferably connected to one of the panes via at least one thermoplastic connecting film. The connection is made by the action of heat, vacuum and/or pressure according to methods known per se. The two aforementioned connecting films on both sides of the multilayer film preferably project circumferentially beyond the multilayer film. Particularly preferably, the side edges of the multilayer film are surrounded circumferentially by a frame-like third thermoplastic connecting film. This has a recess into which the multilayer film is inserted.

The planar electrodes of the functional element comprising electrically controllable optical properties are preferably electrically contacted by means of busbars. These preferably take the form of strips of an electrically conductive film, for example a copper film. The width of the busbars is preferably from 1 mm to 10 mm, for example approximately 5 mm. The thickness of the busbars is preferably from 50 μm to 200 μm, for example approximately 90 μm. These busbars are preferably arranged in the edge region of the functional element in direct contact with the planar electrodes. The busbars are in particular arranged completely within the masking region of the composite pane so that they are not visible. The busbars are in turn connected to the voltage source by means of electrical cables.

The functional element typically has a substantially polygonal shape which depends on the shape of the composite pane, for example substantially the shape of a rectangle, a triangle or a trapezoid. The shape can have slight deviations from a strictly geometric polygon, for example the sides can be slightly curved instead of straight. However, the circumferential side edge of the functional element has a plurality of portions which are straight or slightly curved (that is to say have a constant or continuously changing extension direction), wherein adjacent portions are separated from one another by corners at which the direction of extension abruptly changes.

The planar electrodes are preferably each electrically contacted in at least one portion of the circumferential edge region of the functional element by a busbar. Particularly preferably, the busbar of the first planar electrode and the busbar of the second planar electrode are arranged in the same portion of the circumferential edge region and are in particular substantially flush in this case. Very particularly preferably, the busbars are arranged along a large part of at least one of the sides of the polygonal shape (for example along at least 80% or at least 90% of said side).

In this case, at least the portion of the masking region in which the busbars are arranged is provided with the pattern of coated regions having the partially transparent reflective coating. In said portion, the pattern preferably extends across at least 80% of the width of the masking region, particularly preferably at least 90%, in particular across substantially the entire width. If the functional element (and also the composite pane) is substantially polygonal and the busbars are arranged on one of the sides of the polygon, in particular along a large part of this side, a frame-like masking region shall be provided in order to conceal the circumferential side edge of the functional element at least for the usual case in which the functional element is completely embedded within the intermediate layer and no part thereof extends up to the side edge of the composite pane. This frame-like masking region is likewise essentially polygonal in shape in accordance with the shape of the composite pane. The pattern of coated regions is then present at least in the region in which the busbars are also arranged, in particular the entire side of the polygonal masking region in which the busbars are arranged is provided with the pattern. This is advantageous in particular in the case of functional elements having comparatively slow switching behaviour, in particular in the case of electrochromic functional elements, because the change in the optical properties spreads from the busbars and across the see-through region of the composite pane. The direction of spreading can be indicated by the pattern of printed-on regions that is assigned to the busbars so that the inhomogeneous switching behaviour appears to be less disturbing, or even desirable, to the user.

In a particularly preferred embodiment, the busbars are circumferentially mounted (completely or interruptedly) on the planar electrodes. The busbars are therefore not only attached to one side of the functional element but also along the entire circumferential edge region. This is advantageous in particular in the case of functional elements having comparatively slow switching behaviour, in particular in the case of electrochromic functional elements, because the circumferential electrical contact results in a faster change in the optical properties after a switching operation. The change in the optical properties then proceeds from the circumferential edge of the see-through region and spreads into the centre of the see-through region, which is also referred to as the "iris effect". The busbars can be formed from a single circumferential strip of an electrically conductive film (completely circumferential, wherein there can be a gap between the ends of the circumferential strip). Alternatively, however, the busbars can also have gaps (circumferential with interruptions). They can be composed of a plurality of strips of an electrically conductive film, and there can be gaps between the strips, in particular at the corners of the polygonal functional element. However, at least 80% of the circumferential edge region of the planar electrodes should be provided with the busbars, preferably at least 90%, in particular at least 95%. The masking region surrounds the see-through region in a frame-like manner and covers the circumferential side edge of the functional element and the circumferential busbars. In this case, the entire circumference of the masking region is provided with the pattern of coated regions. By means of the pattern of printed-on regions assigned to the circumferential busbars, the direction of spreading can be indicated in the direction of the centre of the see-through region so that the iris effect appears to be less disturbing, or even desirable, to the user.

If the circumferential busbars are composed of a plurality of strips of an electrically conductive film, the individual strips can optionally be electrically contacted independently of one another. Independent switching regions in the see-through region can thus be formed. The individual strips are connected, for example, via thin wires to a control unit, for example a flexible printed circuit board laminated into the composite pane. The wires preferably have a diameter of 90 μm to 110 μm. For practical and electrical reasons, the wires should have a distance of at least 5 mm from one another and should be at a distance of at least 6 mm from the side edge of the composite pane. The wires should also run entirely within the masking region.

The partially transparent reflective coating preferably contains a metal oxide. The metal is particularly preferably selected from the group consisting of aluminium, tin, titanium, copper, chromium, cobalt, iron, manganese, zirconium, cerium, yttrium, silver, gold, platinum and palladium. The coating can also contain mixtures of said oxides or mixed oxides of said metals. With such metal oxides, visually attractive partially transparent reflective properties can be achieved. The content of metal oxide in the reflective coating is preferably at least 70%, particularly preferably at least 80%, very particularly preferably at least 90%.

The thickness of the partially transparent reflective coating is preferably from 5 μm to 50 μm, particularly preferably from 8 μm to 16 μm. Particularly good results are achieved thereby.

The partially transparent reflective coating is preferably applied to the coated regions using a printing method, i.e. printed thereon. Here, the coating is applied to the coated regions as a printing paste where it is dried or baked.

Screen printing is particularly preferred. Here, the printing paste is printed through a fine-mesh fabric. The printing ink is pressed through the fabric with a rubber squeegee, for example. A template, for example made of metal or plastics, is typically arranged on the fabric, which template has regions which are permeable to the printing paste in addition to regions which are impermeable to the printing paste, thereby determining the geometric shape of the print, in the present case the pattern of printed-on regions. Instead of using a template, the fabric itself can be designed having permeable and impermeable regions and thus itself function as a template.

Alternatively, however, other printing methods can also be used, such as pad printing or stamp printing. Alternatively, instead of being printed the coating can also be applied manually, for example using a brush.

In addition to the reflective material (in particular metal oxide), the printing paste typically contains a solvent. Preferred solvents are alcohols, glycols (for example polypropylene glycols) or derivatives thereof. The printing paste also preferably contains a thickener, for example a cellulose derivative or polyacrylic acid.

Such pastes for the production of reflective layers are commercially available—for example, from Ferro GmbH. In addition, such coatings are known from the patent literature, for example from WO2005063645.

Printing the partially transparent reflective coating onto the outer pane can take place before or after the production of the composite pane. After the printing paste has been printed on, the outer pane (or the composite pane) is subjected to thermal treatment, wherein the solvent is expelled by evaporation and the coating is affixed to the surface of the outer pane. The thermal treatment process can also take place in a plurality of steps, for example a drying step at 50° C. to 180° C. and a baking step (calcination) at 200° C. to 1000° C., in particular at 400° C. to 700° C.

The partially transparent reflective coating is particularly preferably a sol-gel coating, i.e. is produced on the coated regions as part of the sol-gel process. As a result, mechanically and chemically stable coatings with good partially transparent properties are accessible. Firstly, a sol containing the precursors for the coating is provided and matured. The maturation may include hydrolysis of the precursors and/or a (partial) reaction between the precursors (in particular partial aggregation by polycondensation). In the context of the invention, this sol is referred to as precursor sol and preferably contains metal oxide precursors in a solvent. The metal oxide precursors may be present, for example, as organometallic compounds, as metal alcoholates or as metal carboxylates. In a preferred embodiment, the metal (for example of the metal alcoholate or carboxylate) is stabilized in the form of a chemical complex by ligands, whereby reactivity can be reduced and the resistance of the sol to atmospheric humidity can be improved. Suitable ligands are, for example, 2,4-diketones.

The solvent of the sol is preferably alcohol, ether or glycol. Particular preference is given to alcohols such as ethanol, n-propanol, isopranol or butanol. Particular preference is also given to glycols such as di-, tri-, tetra-, penta- or hexamers of ethylene glycol, polypropylene glycols (for example dipropylene glycol, tripropylene glycol or tetrapropylene glycol) and also derivatives thereof. Particular preference is also given to ethers such as dimethyl ether or diethyl ether. It is also possible to use mixtures of said solvents.

Apart from the precursors and the solvent, the sol preferably contains thickener, particularly preferably cellulose derivatives (such as methyl cellulose or ethyl cellulose) or polyacrylic acids. The viscosity of the sol can be adjusted using the thickeners, in particular with regard to the printing process for applying the sol (as a printing paste) to the pane surface.

It is possible for the solvent or the thickener to also function as a complexing agent for the metal oxide precursors if they are suitably selected. In this case, additional ligands do not have to be added specifically.

The sol can also contain typical additives such as are usual in the field of sol-gel technology and are known to the person skilled in the art.

The sol is deposited on the outer surface of the outer pane, preferably printed on as a printing paste. Drying can then take place, whereby solvent is evaporated. This drying can take place at ambient temperature or by separate heating (for example at a temperature of up to 120° C.). Before the solution is applied, the surface is typically cleaned by methods known per se.

The sol is then condensed, as a result of which the coating according to the invention is formed. The condensation process can comprise a thermal treatment step, for example at a temperature of 500° C. to 700° C. Here, crosslinking processes typically take place amongst the precursors, whereby the precursors first combine to form aggregates (aggregation, typically as a result of hydrolysis of the precursors and polycondensation reactions amongst them), and these are subsequently crosslinked to form a gel (gelation). Aggregation can also already partially take place in solution before this is applied to the pane surface.

In a particularly advantageous embodiment, the colour of the partially transparent reflective coating is matched to the functional element so that the coating and the functional element in the darkened state have a similar, ideally substantially identical, hue. This leads to particularly aesthetic results. This is advantageous in particular in the case of electrochromic functional elements which are distinguished by a distinctive colour (compared, for example, with SPD or PDLC functional elements).

In an advantageous embodiment, the coverage density of the pattern of coated regions decreases in the direction of the see-through region. This means that the proportion of uncoated surface in the pattern increases in the direction of the see-through region and the proportion of coated surface decreases in the direction of the see-through region. This can be created by the number of coated regions per unit area decreasing in the direction of the see-through region and/or the size of the coated regions decreasing in the direction of the see-through region. The surface coverage depends on the distance from the see-through region, wherein the surface coverage increases with increasing distance from the see-through region. This is advantageous particularly in the case of functional elements having comparatively slow switching behaviour, in particular in the case of electrochromic functional elements. In such functional elements, the change in the optical properties of the see-through region is not perceived by the user to be simultaneously homogeneous, but it noticeably spreads out from the edge of the see-through region (which is at a short distance from the busbar) toward the centre of the pane. This direction of the time-delayed change in the optical properties is indicated visually so to speak, by the inhomogeneous pattern of coated regions, the surface coverage of which decreases in the direction of the see-through region, as a result of which the user perceives the delay to be less distracting, if not deliberately designed. Depending on the application, however, it is alternatively also possible for the coverage density of the pattern of coated regions to increase in the direction of the see-through region.

In a further advantageous embodiment, the pattern of coated regions is made up of lines or strips which is directed toward the see-through region. In other words, the coated regions are designed to be linear or strip-like and their extension direction points towards the see-through region. This embodiment is also advantageous in the case of functional elements having comparatively slow switching behaviour, in particular in the case of electrochromic functional elements. The direction of the time-delayed change in the optical properties is indicated visually so to speak by the orientation of the lines or strips, as a result of which the user perceives the delay as less distracting, if not deliberately designed.

Ideally, the functional element should be protected from ultraviolet (UV) and infrared (IR) components of the solar radiation, which can lead to degradation thereof. Protection against UV radiation is preferably provided by a thermoplastic layer between the functional element and outer pane containing UV blockers. Protection against IR radiation is preferably provided by an IR-reflecting coating. The IR-reflecting coating can be arranged directly on the outer pane, in particular on its interior-side surface. If both a cover print and an IR-reflecting coating are arranged on the interior-side surface of the inner pane, the cover print can optionally destructive properties with respect to the IR-reflecting coating so that the latter is automatically removed in the regions of the cover print. The IR-reflecting coating can be arranged above or below the cover print (in relation to the outer pane). Typical IR-reflecting coatings are thin-layer stacks with at least one silver-based layer.

However, the IR-reflecting coating can also be provided on a carrier film and incorporated in the intermediate layer, between the functional element and the outer pane. For this purpose, the coated carrier film is preferably arranged between two connecting films. Carrier films are typically based on PET and have a thickness of 20 μm to 200 μm.

The composite pane according to the invention can be produced by methods known per se. The outer pane and the inner pane, together with the layers consisting of the intermediate layer and the functional element between them, are arranged to form a layer stack and laminated to one another, for example by means of autoclave methods, vacuum bags, vacuum ring methods, calender methods, vacuum laminators or combinations thereof. The outer pane and inner pane are usually connected via the intermediate layer under the effect of heat, vacuum and/or pressure. The application of the partially transparent reflective coating to the outer surface of the outer pane can take place before or after lamination of the composite pane. As already described, the partially transparent reflective coating is preferably applied by printing methods and formed using a sol-gel process.

The composite pane can be flat or curved in one or both spatial directions, as is common in particular for vehicle windows of passenger cars. Typically, the outer pane and the inner pane are curved before they are laminated to form the composite pane. The partially transparent reflective coating is preferably applied before the panes are curved, since coating is easier to carry out on flat panes.

The invention also comprises the use of a composite pane according to the invention as a vehicle window, particularly preferably as a vehicle side window, in particular a raisable and lowerable side window that is to be opened. Since the masking region is not usual in such panes, the partially transparent reflective coating according to the invention, which is designed to be visually less conspicuous, has a particularly advantageous effect here. However, the composite pane can also be used as a different type of vehicle window, for example as a windshield, roof panel or rear window. It is also possible to use the composite pane in the architectural field, for example as a window pane of a building or of a space inside a building or as a glass façade.

Figure 2:
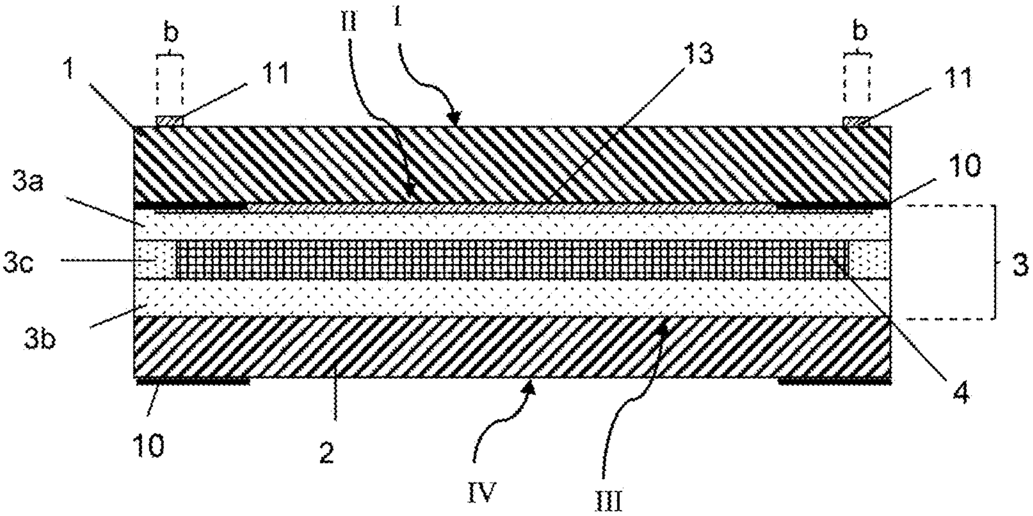
Figure 3:
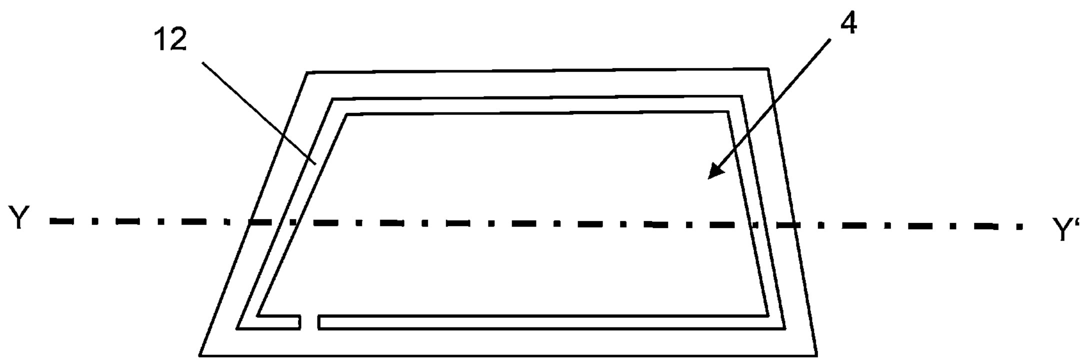
Figure 4:
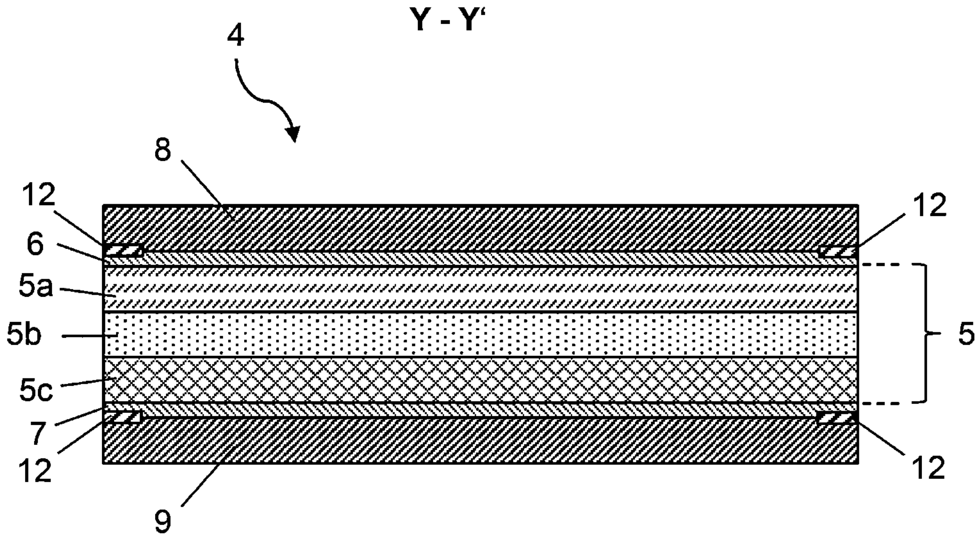
Figure 5:
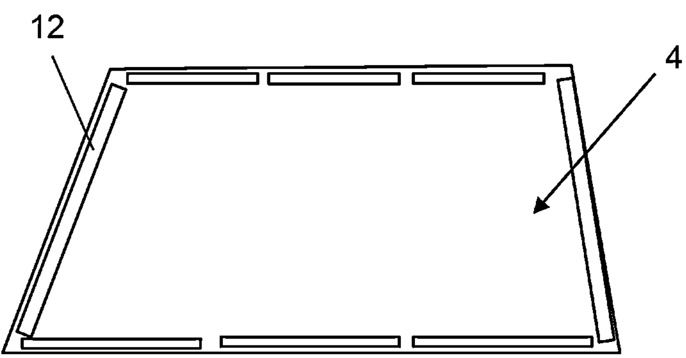
Figure 6:
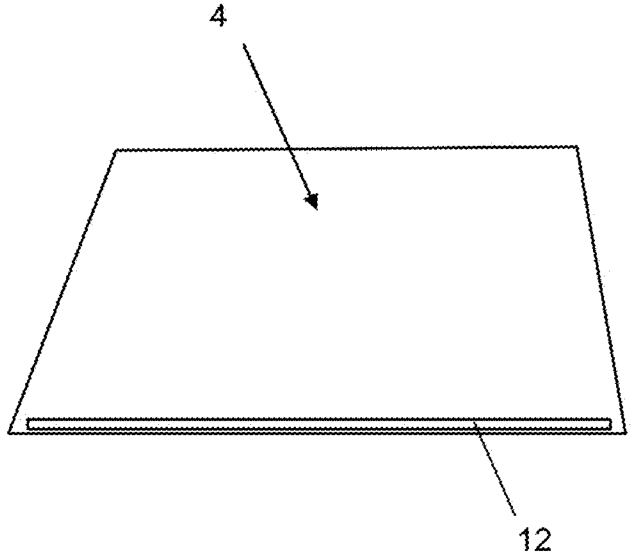
Figure 7:
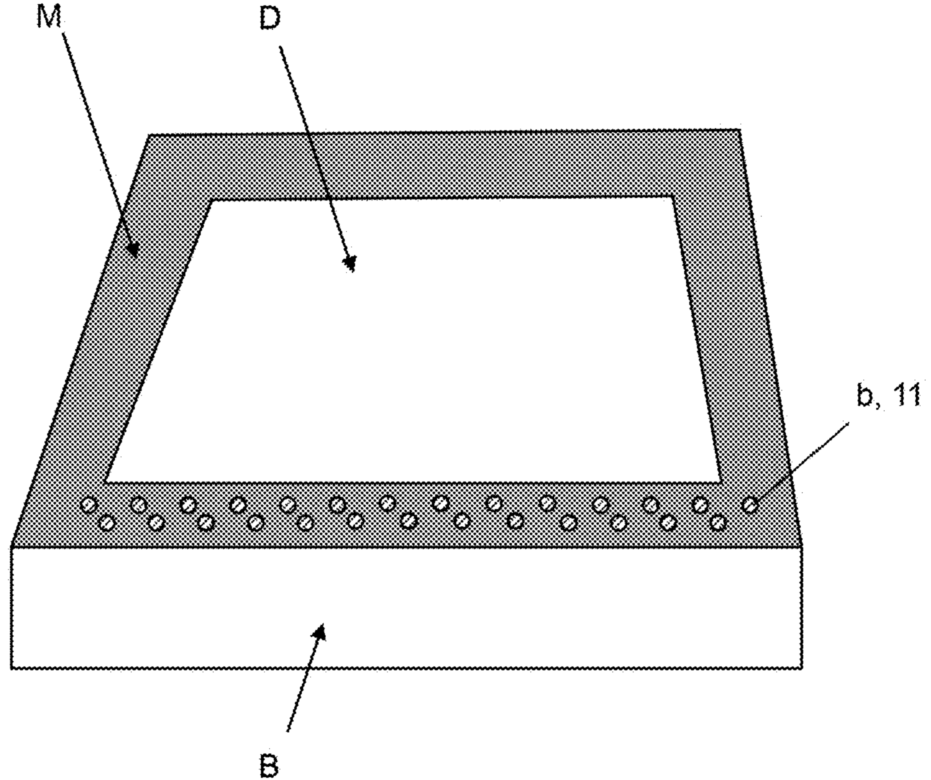
Figure 8:
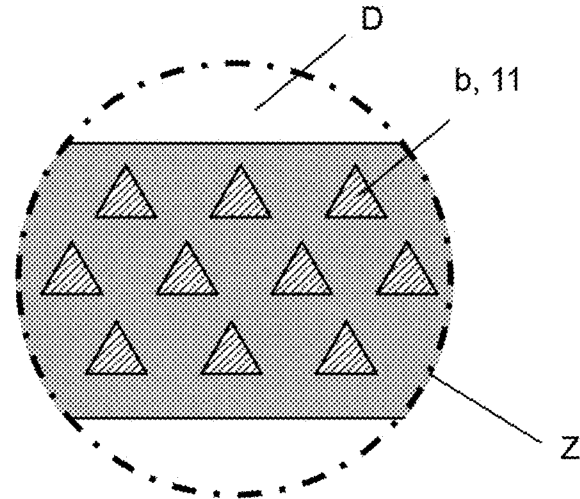
Figure 9:
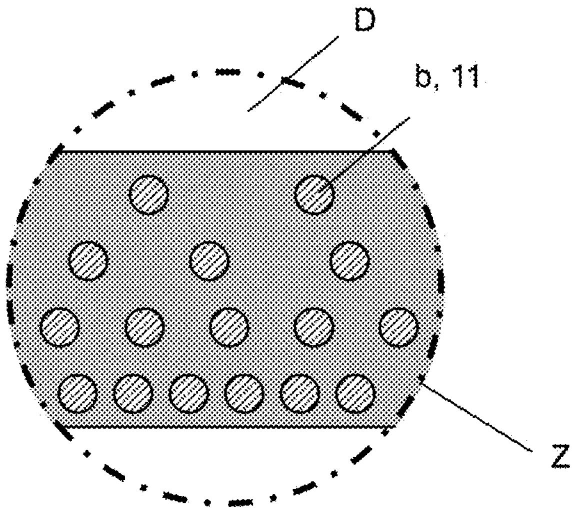
Figure 10:
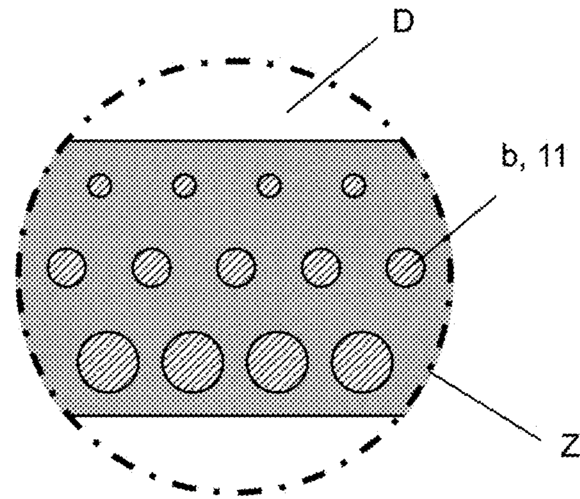
Figure 11:
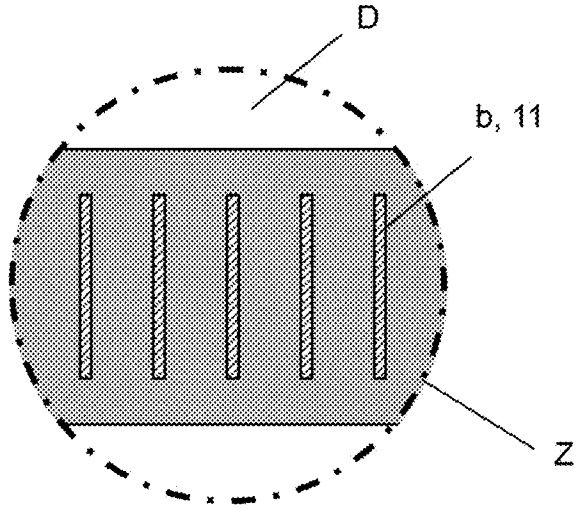

The invention is explained in more detail with reference to drawings and embodiments. The drawing is a schematic representation and is not true to scale. The drawing does not limit the invention in any way. Shown are:

FIG. 1 a plan view of an embodiment of a composite pane according to the invention, FIG. 2 a cross section along X-X' through the composite pane according to FIG. 1, FIG. 3 a plan view of the functional element of the composite pane according to FIG. 1, FIG. 4 a cross-section along Y-Y' through the functional element of FIG. 3, FIG. 5 a plan view of a further embodiment of the functional element, FIG. 6 a plan view of a further embodiment of the functional element, FIG. 7 a plan view of a composite pane comprising the functional element according to FIG. 6, FIG. 8 an enlarged view of the detail Z from FIG. 1 in one embodiment of the invention, FIG. 9 an enlarged view of the detail Z in a further embodiment, FIG. 10 an enlarged view of the detail Z in a further embodiment, and FIG. 11 an enlarged view of the detail Z in a further embodiment.

FIG. 1 and FIG. 2 each show a detail of a composite pane according to the invention. The composite pane is provided, for example, as a side window of a passenger car that is to be opened, that is raised and lowered. The composite pane comprises an outer pane 1 and an inner pane 2, which are connected to one another via an intermediate layer 3. The outer pane 1 and the inner pane 2 consist of clear soda-lime glass having a thickness of 2.1 mm. In the installed position, the outer pane 1 faces the external environment; the inner pane 2 faces the vehicle interior. The outer pane 1 has an outer surface I and an interior-side surface II. Likewise, the inner pane 2 has an outer surface III and an interior-side surface IV. In the installed position, the outer surfaces I, III face the external environment, the interior-side surfaces II, IV face the vehicle interior.

The composite pane has a central transparent see-through region D and an opaque masking region M surrounding it in a frame-like manner. The opaque masking region M is formed by a cover print 10 on the interior-side surfaces II, IV of the outer pane 1 and of the inner pane 2. The cover print 10 is formed from a black enamel which contains a black pigment and glass frits and is baked into the surfaces II, IV. The masking region M surrounds in a circumferential edge region the region of the side window that is visible in the closed state. Below the marking region M and the see-through region D, the composite pane has a mounting region B which is always arranged within the vehicle body and serves to connect the composite pane to the mechanism for lifting and lowering it. For this purpose, the mounting region B can have holes and/or mounting elements (not shown).

The intermediate layer 3 comprises a total of three thermoplastic layers 3_a_, 3_b_, 3_c_ which are each formed by a thermoplastic PVB film. The first thermoplastic layer 3_a_ is connected to the outer pane 1, for example has a thickness of 0.76 mm and contains UV blockers. The second thermoplastic layer 3_b_ is connected to the inner pane 2 and has, for example, a thickness of 0.38 mm. The third thermoplastic layer 3_c_ located therebetween has a thickness of 0.38 mm, for example, and is designed having a recess in which a functional element 4 comprising electrically controllable optical properties is embedded in a substantially precise fit, i.e. approximately flush on all sides. The third thermoplastic layer 3_c_ thus forms a kind of mount or frame so to speak for the approximately 0.4 mm-thick functional element 4, which does not extend as far as the side edges of the composite pane but which is encapsulated all around in thermoplastic material and protected thereby. The functional element 4 is an electrochromic multilayer film which can be switched from a transparent, uncoloured state into a coloured state with a reduced degree of light transmission.

The functional element 4 completely covers the see-through region D and extends into the masking region M, where its side edges are arranged, so that these are not visible. The light transmission of the see-through region D can be electrically controlled by the user via the functional element 4.

The functional element 4 is protected from UV radiation by the UV-blocking first thermoplastic layer 3_a_. In order to protect the functional element 4 on against infrared components of the sunlight, a sun protection coating 13 is arranged on the interior-side surface II of the outer pane 1. The sun protection coating 13 is, for example, a sputtered-on thin-layer stack with one or more silver layers. A circumferential edge region of the outer pane 1 is not with the sun protection coating 13, so that it has no contact with the atmosphere and is protected against corrosion. The side edges of the sun protection coating 13 are likewise arranged within the masking region M.

Modifications of the illustrated embodiment are conceivable. Thus, instead of being formed by the covering print 10, the masking region M can also be formed by an opaquely coloured region of at least one of the thermoplastic layers 3_a_, 3_b_, 3_c_. IR protection can also be provided by an IR-reflecting film instead of by the sun protection coating 13 on the outer pane 1. Such films consist, for example, of a PET carrier film with an IR-reflecting coating. Typically, the IR-reflecting film is inserted between two layers of the intermediate layer 3, in particular between the first thermoplastic layer 3_a_ and a further thermoplastic layer which is arranged between the first thermoplastic layer 3_a_ and the outer pane 1. The further thermoplastic layer can be designed, for example, as a PVB film having a thickness of 0.38 mm.

In the masking region M, the outer surface I of the outer pane 1 is provided with a pattern of coated regions b which have a partially transparent reflective coating 11. The coating 11 is a sol-gel coating which has been applied to the surface I by screen printing. It contains metal oxide, for example titanium oxide, and has a thickness of preferably from 50 nm to 200 nm, for example 70 nm. The pattern having the coated regions b serves to make the masking region more aesthetically pleasing. Since masking regions are unusual for side windows, the viewer shall perceive the masking region M as less distracting due to the coated region b.

FIG. 3 and FIG. 4 each show a detail of the functional element 4 from FIG. 1. The functional element 4 is an electrochromic multilayer film. The multilayer film is limited by a first carrier film 8 and a second carrier film 9. The carrier films 8, 9 are made of PET and have a thickness of, for example, 0.125 mm. The carrier films 8, 9 are each provided with a coating made of ITO having a thickness of about 100 nm, which form a first planar electrode 6 and a second planar electrode 7. An active layer sequence 5 is arranged between the planar electrodes 6, 7. The layer sequence 5 is an electrochromic layer sequence and consists of an ion storage layer 5_a_, an electrolyte layer 5_b_ and an electrochromic layer 5_c_. By means of a DC voltage applied to the planar electrodes 6, 7, ions can be excited to migrate from the ion storage layer 5_a_, through the electrolyte layer 5_b_ and into the electrochromic layer 5_c_, and vice versa. The proportion of ions in the electrochromic layer 5_c_ determines the optical properties thereof, in particular the degree of light transmittance and the colour.

The two planar electrodes 6, 7 are each circumferentially electrically contacted to a busbar 12. The busbars 12 serve to connect the planar electrodes 6, 7 to an external voltage source in order to provide the voltage required for controlling the optical properties. The busbars 12 are arranged within the masking region M. Each busbar 12 is formed from a single strip of copper foil, which completely surrounds the relevant planar electrode 6, 7, wherein a gap is present only between the ends of the strip.

Circumferential busbars 12 are advantageous in the case of electrochromic functional elements 4, since they have comparatively slow switching behaviour. A faster change in the optical properties of the see-through region D is achieved by the circumferential electrical contact. Nevertheless, the viewer does not perceive the change in the optical properties to be homogeneous—instead it proceeds from the edge region of the see-through region D and noticeably continues towards the centre. This observation is also referred to as the “iris effect”. The pattern of printed on regions b according to the invention can be used to indicate the direction of the delayed change in the optical properties and to present this iris effect as being deliberately generated, which increases the aesthetic value of the composite pane. Possible embodiments of the pattern are shown by way of example in FIGS. 8 to 11.

FIG. 5 shows a further embodiment of the functional element 4 comprising circumferential busbars 12. The busbars 12 are each composed of a plurality of strips of copper foil with gaps being able to form between adjacent strips. This embodiment can be preferred to that of FIG. 3 for manufacturing reasons. In addition, it opens up the possibility of independent electrical control of the individual strips of the busbars 12 so that independent switching regions are formed, the optical properties of which can be controlled independently of one another.

FIG. 6 and FIG. 7 each show a detail of a further embodiment of the composite pane according to the invention, which is likewise a side window that is to be opened of a passenger car. FIG. 6 is a plan view of the functional element 4 comprising the busbars 12; FIG. 7 is a plan view of the composite pane equipped therewith.

The embodiment is in principle structured in the same way as that of FIGS. 1 to 4. The difference is that the busbars 12 are not arranged circumferentially, but only along the lower edge of the functional element 4. The change in the optical properties of the electrochromic functional element 4 therefore proceeds from the lower edge and continues in the direction of the upper edge. In allusion to the "iris effect", this could be referred to as a "sunrise effect". In order to indicate the direction of the delayed change in the optical properties, in this case only the portion of the masking region M in which the busbars are arranged is provided with the pattern of printed-on regions b, adjacent to the lower edge of the see-through region D (starting point of the change in the optical properties). Alternatively, it is also possible to additionally provide the opposite portion of the masking region M adjacent to the upper edge of the see-through region D with the pattern (end point of the change in the optical properties). It is also alternatively possible in this embodiment to circumferentially provide the entire masking region M with the pattern.

FIG. 8 shows the detail Z from FIG. 1 enlarged in an embodiment of the pattern of coated regions b as per the invention. The pattern is homogeneous, i.e. the coated regions b are equally distributed and identical. The individual coated regions b are shown by way of example as triangles, but can also have any other shape. The triangle symbolizes a shape with a preferred direction (upward-pointing tip of the triangle), which is directed toward the see-through region. In this way, the direction of the change in the optical properties can be indicated despite the homogeneity of the pattern.

FIG. 9 shows the detail Z from FIG. 1 enlarged in a further embodiment of the pattern of coated regions b as per the invention. The pattern is not homogeneous. Instead, the surface coverage of the coating 11 decreases in the direction of the see-through region D. As a result, the direction of the change in the optical properties can be indicated. The individual printed-on regions b are identical and have the same shape and size. The change in surface coverage is made by a decrease in the number of printed-on regions b per unit area in the direction of the see-through region D. The individual coated regions b are shown by way of example as circles, but can also have any other shape, for example the company logo of the vehicle manufacturer.

FIG. 10 shows the detail Z from FIG. 1 enlarged in a further embodiment of the pattern of coated regions b as per the invention. The pattern is not homogeneous here either. Instead, the surface coverage of the coating 11 decreases in the direction of the see-through region D. As a result, the direction of the change in the optical properties can be indicated. The change in surface coverage is formed by the size of the individual printed-on regions becoming smaller in the direction of the see-through region D. The individual coated regions b are shown by way of example as circles, but can also have any other shape, for example the company logo of the vehicle manufacturer.

FIG. 11 shows the detail Z from FIG. 1 enlarged in a further embodiment of the pattern of coated regions b as per the invention. The individual coated regions b are designed in a linear fashion as thin strips which are directed towards the see-through region D. As a result, the direction of the change in the optical properties can be indicated.

LIST OF REFERENCE SIGNS (1) Outer pane
(2) Inner pane
(3) Thermoplastic intermediate layer
(3*a*) First layer of the intermediate layer 3
(3*b*) Second layer of the intermediate layer 3
(3*c*) Third layer of the intermediate layer 3
(4) Functional element
(5) Active layer sequence of the functional element 4
(5*a*) Ion storage layer of an electrochromic layer sequence 5
(5*b*) Electrolyte layer of an electrochromic layer sequence 5
(5*c*) Electrochromic layer of an electrochromic layer sequence 5
(6) First planar electrode of the functional element 4
(7) Second planar electrode of the functional element 4
(8) First carrier film of the functional element 4
(9) Second carrier film of the functional element 4
(10) Cover print
(11) Partially transparent reflective coating
(12) Power busbar
(13) Sun protection coating
(I) Outer surface of the outer pane 1
(II) Interior-side surface of the outer pane 1
(III) Outer surface of the inner pane 2
(IV) Interior-side surface of the inner pane 2
(M) Opaque masking region of the composite pane
(D) Transparent see-through region of the composite pane
(B) Mounting region of the composite pane
(b) Coated region of the outer surface I of the outer pane 1
X-X' Section line
Y-Y' Section line
Z Enlarged region

The invention claimed is:

1. A composite pane, comprising an outer pane and an inner pane, which are connected to one another via a thermoplastic intermediate layer, wherein the composite pane has an opaque masking region and a transparent see-through region, wherein the intermediate layer has a functional element which covers the entire see-through region, wherein at least one region of a side edge of the functional element does not extend as far as a side edge of the composite pane but is arranged in the masking region, and wherein a surface of the outer pane facing away from the intermediate layer has a pattern of coated regions in the masking region which are provided with a partially transparent reflective coating.

2. The composite pane according to claim 1, wherein the masking region surrounds the see-through region in a frame-like manner.

3. The composite pane according to claim 1, wherein the masking region is formed by a cover print on a surface of the outer pane facing the intermediate layer or by a tinted or coloured film in the intermediate layer.

4. The composite pane according to claim 3, wherein the functional element is an electrochromic functional element comprising an electrochromic active layer sequence between two planar electrodes.

5. The composite pane according to claim 4, wherein the two planar electrodes are electrically contacted in at least one portion of an edge region of the functional element in each case by a busbar, wherein the busbars are arranged in the masking region and wherein at least the portion of the masking region in which the busbars are arranged is provided with the pattern of coated regions.

6. The composite pane according to claim 4, wherein the busbars are mounted on the circumference of the two planar electrodes, the masking region surrounds the see-through region in a frame-like manner, and the masking region is circumferentially provided with the pattern of coated regions.

7. The composite pane according to claim 1, wherein the partially transparent reflective coating is printed onto the coated regions.

8. The composite pane according to claim 1, wherein the partially transparent reflective coating is a sol-gel coating.

9. The composite pane according to claim 1, wherein the partially transparent reflective coating contains metal oxide.

10. The composite pane according to claim 9, wherein the metal is selected from the group consisting of aluminium, tin, titanium, copper, chromium, cobalt, iron, manganese, zirconium, cerium, yttrium, silver, gold, platinum and palladium.

11. The composite pane according to claim 1, wherein a thickness of the partially transparent reflective coating is from 5 μm to 50 μm.

12. The composite pane according to claim 1, wherein a coverage density of the pattern of coated regions decreases toward the see-through region.

13. The composite pane according to claim 1, wherein the pattern of coated regions is formed from lines or strips directed toward the see-through region.

14. The composite pane according to claim 1, wherein the partially transparent reflective coating has a degree of transmission and a degree of reflection in the visible spectral range that are each at least 10%.

15. A method comprising providing a composite pane according to claim 1 as a vehicle window.

16. The composite pane according to claim 7, wherein the partially transparent reflective coating is printed onto the coated regions by screen printing.

17. The composite pane according to claim 11, wherein the thickness of the partially transparent reflective coating is from 8 μm to 16 μm.

18. The method according to claim 15, wherein the vehicle window is a vehicle side window.

19. The composite pane according to claim 1, wherein the coated regions of the pattern are mutually isolated from one another such that each coated region is completely surrounded on the surface of the outer pane by an uncoated region not provided with the partially transparent reflective coating, and wherein adjacent coated regions are separated from one another by an uncoated distance of at least 0.5 mm.

20. The composite pane according to claim 1, wherein the surface of the outer pane bearing the pattern of coated regions is the outermost surface of the composite pane facing an external environment when the composite pane is installed, and wherein the coated regions occupy from 5% to 90% of a total area of the masking region on the outermost surface, with a remaining area of the masking region on the outermost surface being uncoated.

* * * * *